United States Patent [19]

Harris

[11] Patent Number: 4,717,832
[45] Date of Patent: Jan. 5, 1988

[54] TIDAL AND RIVER TURBINE

[76] Inventor: Charles W. Harris, 1614 Alston Rd., Towson, Md. 21204

[21] Appl. No.: 926,438

[22] Filed: Nov. 3, 1986

Related U.S. Application Data

[63] Continuation-in-part of Ser. No. 776,916, Sep. 17, 1985, abandoned.

[51] Int. Cl.[4] .................... E02B 9/08; F03B 9/00
[52] U.S. Cl. ............................. 290/43; 290/54; 415/7; 416/12; 417/334; 405/75; 60/502
[58] Field of Search .............. 290/42, 43, 53, 54; 415/5, 7; 416/9–15; 417/334–336, 341, 348; 405/75–78; 60/495–500, 502

[56] References Cited

U.S. PATENT DOCUMENTS

| | | | |
|---|---|---|---|
| 3,980,894 | 9/1976 | Vary et al. | 290/54 |
| 3,986,787 | 10/1976 | Mouton, Jr. | 415/7 |
| 4,384,212 | 5/1983 | Lapeyre | 290/53 |
| 4,412,417 | 11/1983 | Dementhon | 60/497 |
| 4,443,708 | 4/1984 | Lapeyre | 290/53 |
| 4,465,941 | 8/1984 | Wilson et al. | 290/43 X |
| 4,524,285 | 6/1985 | Rauch | 290/43 |

Primary Examiner—Patrick R. Salce
Assistant Examiner—Emanuel Todd Voeltz
Attorney, Agent, or Firm—John F. McClellan, Sr.

[57] ABSTRACT

An improved hydroelectric system provides automatic adjustment for both tidal (reversing) and river (one way) type flow. A plurality of parallel, axial flow auger-type impellors are mounted in a horizontal plane on a floating, inverted-dry-dock type vessel that has an upper deck mounting hydroelectric generators. The vessel has no bottom beneath the impellors but has parallel with them on each side a tank for buoyancy and level and flow control. Over and under the impellors are pivoting deflectors that direct flow onto the impellors and automatically reverse and rest against appropriate bumper stops when the flow reverses, from one open end to the other open end of the vessel.

2 Claims, 11 Drawing Figures

TIDAL AND RIVER TURBINE

This application is a continuation-in-part of my application Ser. No. 776,916, filed 9-17-85 for TIDAL AND RIVER TURBINE, now abandoned.

FIELD OF THE INVENTION

This invention relates generally to generators and particularly to an improved turbo-electric generation system for tidal and river use.

DESCRIPTION OF RELATED ART

It has long been known to generate electric power from flowing water, both with waterwheels and with power plant turbines. U.S. patents are known to disclose axial-flow turbine type devices deriving power from liquid flow in tidal runs and stream beds:

U.S. Pat. No. 3,980,894 to P. Vary et al, 9-14-76
U.S. Pat. No. 3,986,787 to W. J. Mouton, Jr., 10-19-76
U.S. Pat. No. 4,384,212 to J. M. Lapeyre, 5-17-83
U.S. Pat. No. 4,412,417 to D. Dementhon, 11-1-83
U.S. Pat. No. 4,443,708 to J. M. Lapeyre, 4-17-84

Pivotal flow-modifying means is shown in the above Mouton, Jr. patent in a multiple unit embodiment.

U.S. Pat. No. 4,465,941 to E. M. Wilson, 8-14-84, discloses a water-wheel type device for the purpose with flow control pivotal valves or deflectors.

However, in spite of the related art attempts, no system is known to have become a standard of industry for the purpose of generating electricity from tidal and/or river flow, and capable of continuous generation under changing flow conditions.

SUMMARY OF THE INVENTION

In addition to that of providing a standard of commerce in hydroelectric generators for the purpose, the present invention has as a principal object that of providing a system of the type described in the form of an axial-flow, multiple unit system with automatically operating flow deflectors of an improved type and efficiency, combined with simplicity and reliability and economy of construction.

Further objects include provision of a hydroelectric generating system as described that is suited for both tidal and continuous one-way river flow applications in converting flow of water to electrical energy, reversal of flow being automatically accommodated. Pivotal deflectors and continuous-type impellors are used in combination with a vessel or floating platform of special design, with wide-spaced tanks for stability and for level control and aiding in flow control.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION OF THE INVENTION

Figure 1:
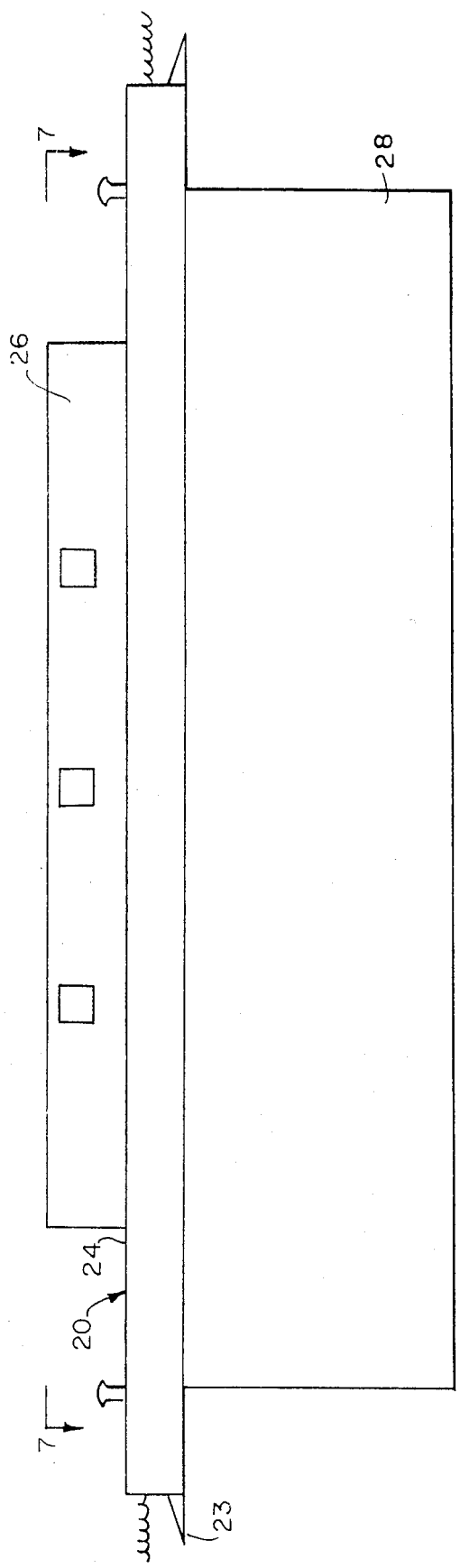
FIG. 1 is a side elevation of a vessel portion of the invention.
Figure 2:
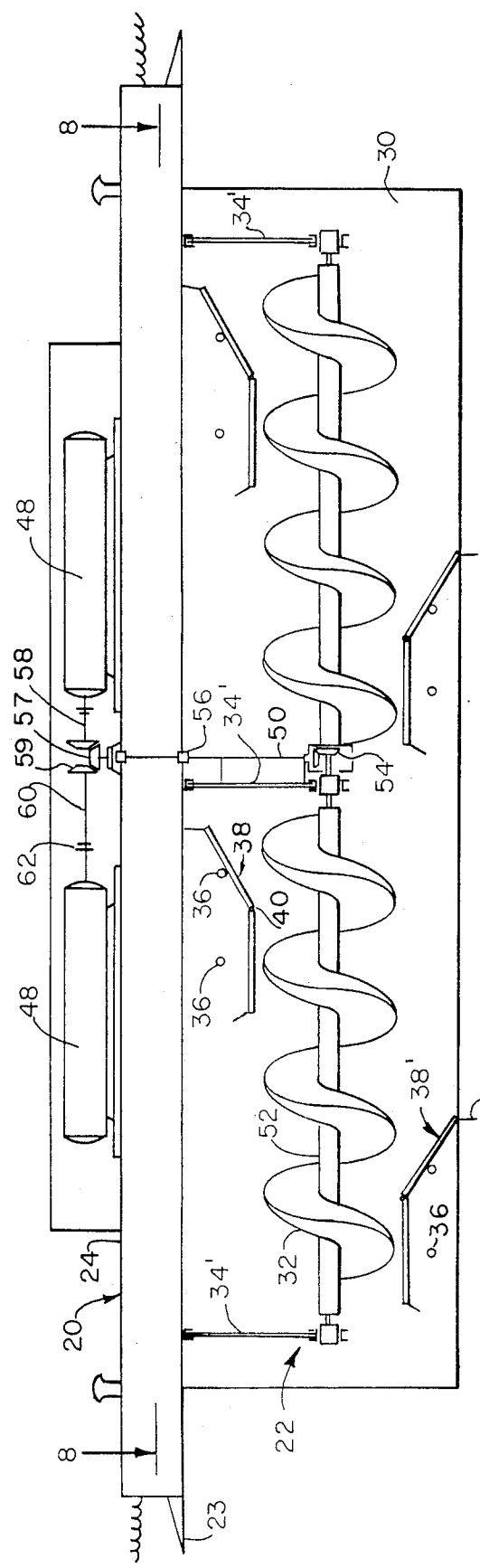
FIG. 2 is a half section of the vessel.

FIGS. 1, 2, 7, 8 and 9 show aspects of a vessel 20; not all views are to the same scale. The vessel will normally float and be anchored in a conventional manner for positioning where desired for tidal or river flow to rotate the auger-type drive 22. Each debris shunt 23 inclines up toward the vessel.

The vessel 20 will be like an inverted dry-dock with open ends and a deck 24 with a housing 26 at the top. The sides 28, 30 are longitudinal parallel-spaced tanks for flotation and to maintain the water level needed for operation of the impellors 32 of the drive, and to provide a foundation for the horizontal impellor support struts 34, deflector axles 40 and the respective bumper stops 36 for limiting swing of the deflectors 38, 38'. The deck 24, and the sidewalls which have angled ends 28', 30' to direct flow onto the impellors, define the open ends and bottom. Preferably, the system is symmetrical about a transverse centerline. The deflectors 38, 38' direct and control flow, but up-and-down, in contrast with the side-to-side directions of the angled ends 28', 30'.

As shown in FIGS. 3, 4, 5 and 9, each deflector is plate-like, bent in the middle to form a shallow "V"-shape, with the axis of the co-aligned stub axles 40 running along the apex of the "V"-shape.

Figure 4:
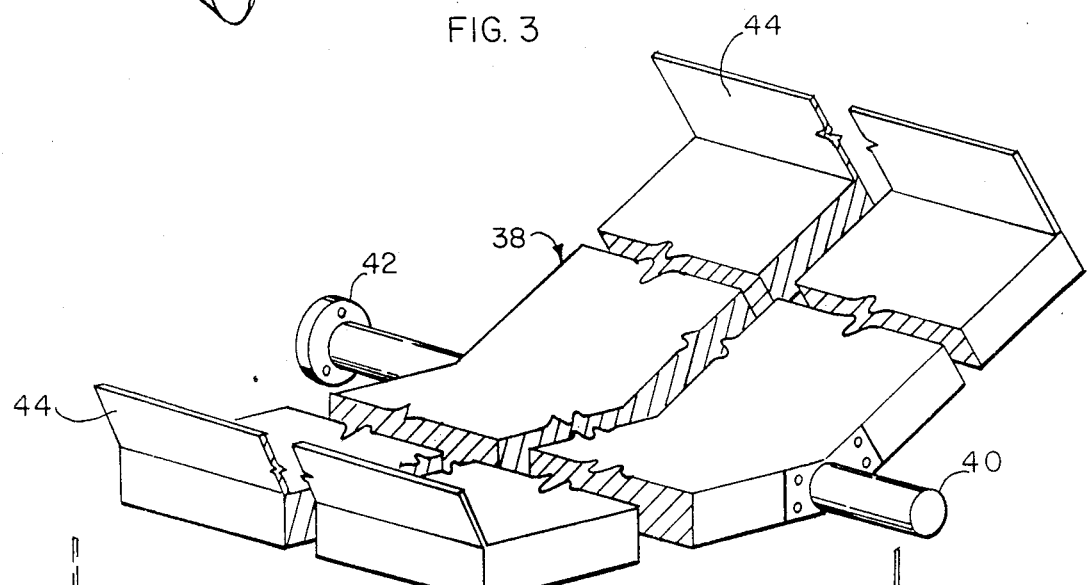
FIG. 4 is a isometric view of a deflector, partially broken away.
Figure 5:
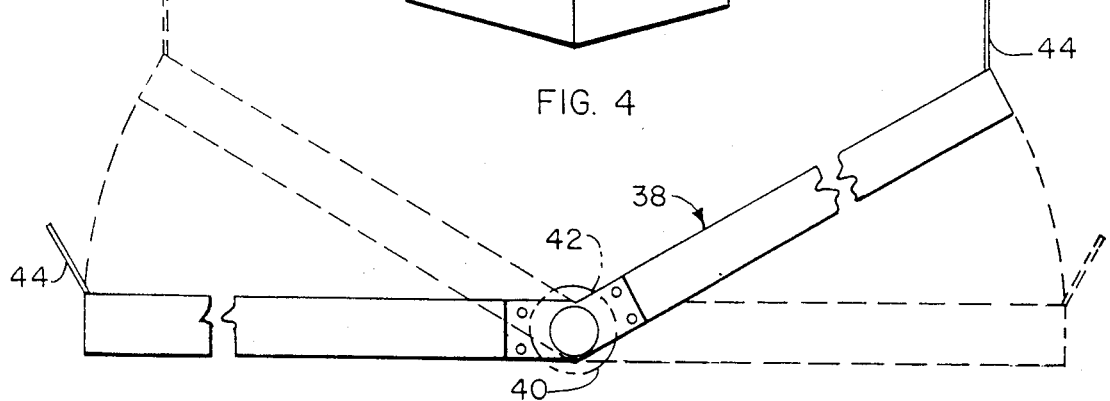
FIG. 5 is a side view of a deflector, partially broken away.

The deflectors 38, 38' (there may be any suitable number of these) may be mounted in staggered relation respectively over and under the impellors 32 between the struts 34 that help mount the impellors, and extend the full width between the first and second sidewalls 28, 30 where the stub axles 40 are held in watertight sidewall-mounted bearings 42 one being diagrammed in FIG. 4 and in FIG. 5.

The deflectors 38 that are above the impellors have the apex of the "V" shape downward and can pivot between the bumper stops 36 to positions with the arms of the "V" shape parallel with the impellors, depending on the direction of flow. The deflectors 38' below the impellors have the apex of the "V"-shape oriented upwardly and are similar limited by the bumper stops 36.

Reversal of operation of the impellors on flow-direction change can be accommodated conventionally in the field windings of the generators with appropriate shunts, or by reversing cam gear in the shafting, also conventional.

To help activate the deflectors 38, 38' to pivot on change to flow direction, each of the arms of the "V"-shape has a steel vane 44 on the end of the arm parallel with the axis and extending from the side opposite to the axis. On the deflectors, the vanes may be parallel to each other.

Figure 11:
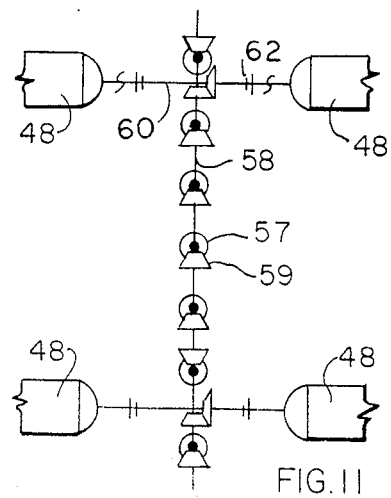
FIG. 11 shows the gearing and shafting and generators partly broken away.

The generator equipment may comprise a plurality (five shown) of aligned generators 48. Each may have a substantially vertical coupling 50 to a respective impellor of the parallel-spaced array of impellors, that lie in a horizontal plane. Shown are conventional shafts 52 as part of the impellor 32 with bevel gears 54 on the impellors and extending up through water-tight bearings 56 to bevel gears 57 in the deck 24, to horizontal shafts 58, 60, FIG. 11, driving the generators 48. Conventional gearing 57, 59 and clutches 62 may be provided to disconnect the generators when desired. Conventional belt drives may be used instead of shafting, if desired.

Figure 10:
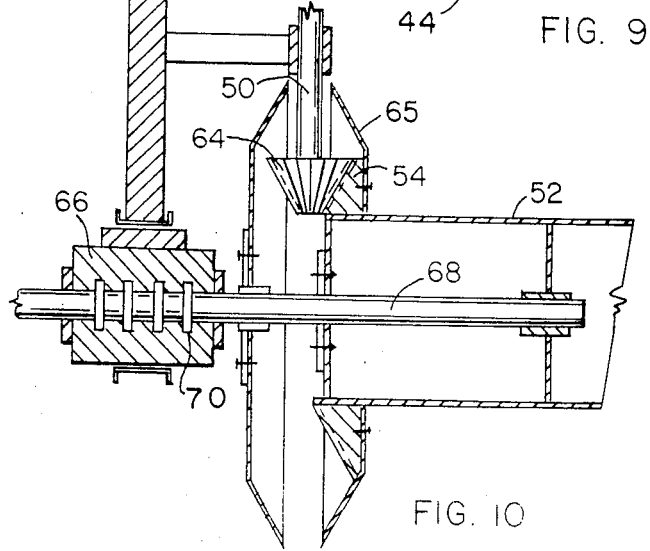
FIG. 10 shows the impellor gear drive partly broken away.

FIG. 10 shows that conventional shields 65 may cover the gearing 64, 54 at the impellors.

FIG. 10 indicates that conventional Kingsbury type thrust bearings 66 may be used for shafts 52, and that for easy assembly a solid shorter and smaller, 68, may be used as a coupling at the drive connection and connect by flanges 70 to the thrust bearings.

Figure 6:
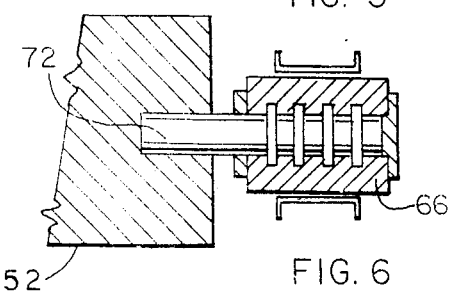
FIG. 6 is a section through a support and thrust bearing.
Figure 7:
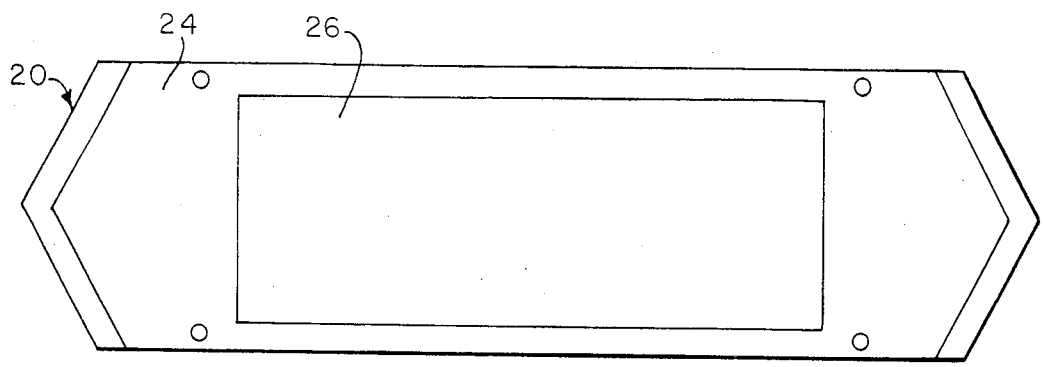
FIG. 7 is a top plan view of the vessel.
Figure 8:
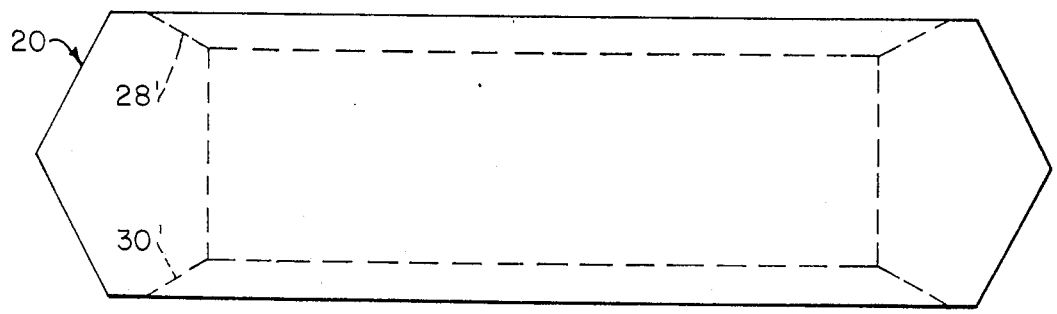
FIG. 8 is bottom plan view of the vessel.
Figure 9:
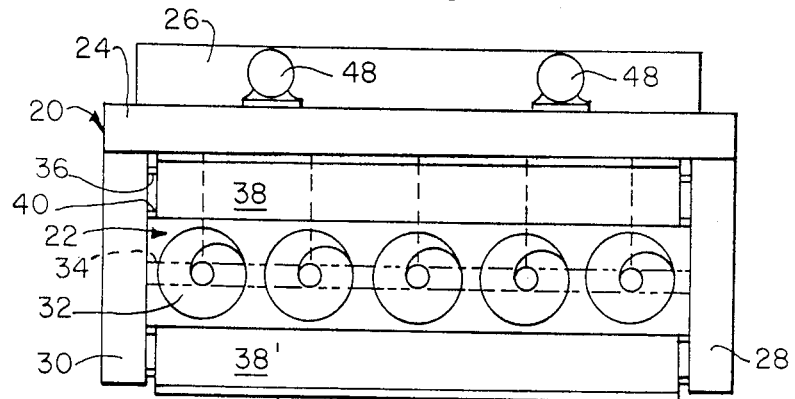
FIG. 9 is a transverse section through the vessel.

FIG. 6 shows that a similar, smaller and shorter shaft 72 is used at the distal ends of the shaft 52 to connect the bearing 66.

Figure 3:
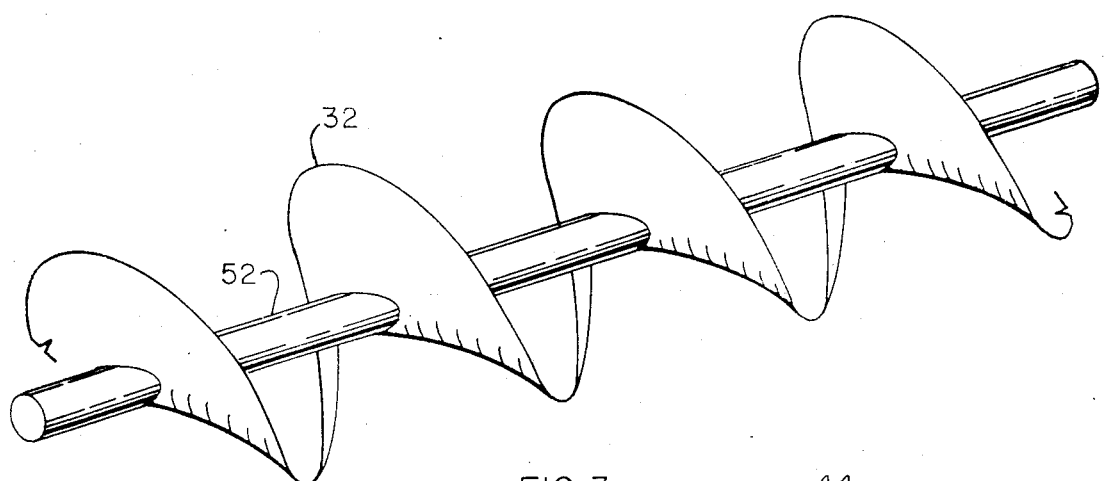
FIG. 3 is a isometric view of a continuous impellor.

Material for the parts may be steel, and the parts may be assembled by bolting and/or welding, for example tubular shaft 52 welded to screw flute, FIG. 3, at 32.

In summary, the efficiency and strength and economy of the embodiment of the invention will be apparent.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States letters patent is:

1. A system for hydroelectric generation of power from flow of water along an auger-type drive for generator equipment mounted adjacent thereto, characterized by: a vessel in the form of an inverted drydock and having a deck and longitudinal parallel-spaced first and second sidewalls defining open ends and bottom, means for mounting said auger-type drive on said vessel beneath said deck and between said sidewalls, means for directing flow of water between said sidewalls for increasing said flow of water onto said auger-type drive, including a plurality of deflectors, respective deflectors of said plurality of deflectors mounted above and respective of said deflectors mounted below said auger-type drive, each deflector extending from the first sidewall to the second sidewall and pivotally mounted to the sidewalls about an axis transverse to said sidewalls, causing it to rotate in a first direction in response to tidal flow of water past it in said first direction and in a second direction in response to tidal flow past it in said second direction; each deflector having an open "V"-shape with first and second arms and with said axis being along the apex of the open "V"-shape; each of said deflectors mounted above the auger-type drive having said apex downward and each of said deflectors mounted below the auger-type drive having said apex upward, bumper stop means on said vessel for limiting pivoting of the deflectors so that a first arm of the open "V"-shape will respectively lie adjacent to the auger-type drive with the flow of water in said first direction therealong and so that a second arm of the open "V"-shape will respectively lie adjacent to the auger-type drive with the flow of water in said second direction therealong.

2. A system as recited in claim 1, said first and second sidewalls being tanks for floating said system, said auger-type drive means including a plurality of parallel, substantially coextensive axial-flow screws substantially continuous from end to end of said vessel, said means for directing flow of water including each of the first and second sidewalls having ends angled for increasing flow of water along the axial flow screws regardless of direction of flow of water, each of said first and second arms having means for assisting pivoting the respective deflector in response to said flow of water, in the form of a vane on the end of the arm parallel with the axis and extending outwardly from the side opposite said apex of the "V"-shape; said generator equipment mounting being above said deck and said auger-type drive including a substantially vertical drive connection from each of said axial flow screws to said generator equipment, said generator equipment including a plurality of generators and fixed at each end of said vessel a debris shunt with an end thereof located for being under water, and an incline portion rising rearwardly therefrom to a location above said end.

* * * * *